United States Patent
Bertoni

(10) Patent No.: US 8,331,565 B2
(45) Date of Patent: Dec. 11, 2012

(54) MESSAGE TRANSMISSION METHOD, PREFERABLY FOR AN ENERGY DISTRIBUTION NETWORK

(75) Inventor: Guido Marco Bertoni, Carnate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 450 days.

(21) Appl. No.: 12/578,029

(22) Filed: Oct. 13, 2009

(65) Prior Publication Data

US 2010/0158250 A1 Jun. 24, 2010

(30) Foreign Application Priority Data

Dec. 23, 2008 (IT) .............................. MI2008A2309

(51) Int. Cl.
*H04K 1/00* (2006.01)
(52) U.S. Cl. ........ 380/255; 713/340; 713/330; 380/277; 380/279
(58) Field of Classification Search .................. None
See application file for complete search history.

(56) References Cited

U.S. PATENT DOCUMENTS

2006/0010324 A1* 1/2006 Appenzeller et al. ......... 713/171

OTHER PUBLICATIONS

Treytl et al, Practical issues on key distribution in power Line Networks, Inistutition forTechnology, Vienna Univeristy of Technolology, IEEE,2005,8 pages.*
Sedoyeka, E., et al., "WiMAX Mesh Networks for Underserved Areas," Anglia Ruskin University, Brunel University, IEEE, 2008, 6 pages.
Treytl, A., et al., "Practical Issues on Key Distribution in Power Line Networks," Institute for Computer Technology, Vienna University of Technology, IEEE, 2005, 8 pages.

* cited by examiner

*Primary Examiner* — Fikremariam A Yalew
(74) *Attorney, Agent, or Firm* — Seed IP Law Group PLLC

(57) ABSTRACT

A process for transmitting a message between a first electronic device and a second electronic device of an energy distribution network is described. The process includes generating, by the first electronic device, a first data encryption key identifying the second electronic device on the basis of a main data encryption key and an identification code of the second electronic device. The process further includes generating, by the first electronic device and the second electronic device, a communication key on the basis of said first data encryption key and a reference datum.

23 Claims, 5 Drawing Sheets

MESSAGE TRANSMISSION METHOD, PREFERABLY FOR AN ENERGY DISTRIBUTION NETWORK

BACKGROUND

1. Technical Field

The technical field relates to data transmission, and particularly to a method for transmitting a message between a first electronic device and a second electronic device belonging to an energy distribution network.

2. Description of the Related Art

An energy distribution network may employ a power line communication for the communication of data between the household meters and a district distribution box or concentrator. The data which can be transmitted are both representative of the energy consumption by a user (communication from meter to distribution box) and network control information (communication from distribution box to meter, and vice versa).

The power line communication represents, in all respects, a data transmission line and, as such, it is subjected to possible fraudulent attacks by malicious third parties who, by forcing the communication line, could alter and/or cancel the data being transmitted, causing irreparable drawbacks on the monitoring of the energy consumptions, and consequently on the relative invoicing by the operator of the energy distribution network or even causing false and unjustified alarms in the same network.

In order to reduce these drawbacks, the need is felt to implement a data transmission method with a suitable safety level in the power line communication as a data transmission line.

In one approach, a data transmission method of a known type is implemented in assigning a secret data communication key to the meters and the concentrator which are operatively connected to the power line communication.

However, this solution has the drawback that it is not very safe, since in the case where an attacker succeeds in accessing, for example, just one of the meters of the energy distribution network, he/she could gain knowledge of the secret data encryption key which is employed in the whole network, and this would be sufficient to compromise the safety of the power line communication and therefore of the data exchanged between the meters and the concentrator.

BRIEF SUMMARY

One embodiment provides a data transmission method that is safer compared to the transmission method of the above-mentioned prior art, and particularly which is more robust in the case where an attacker intercepts a data encryption key which is employed in the transmission.

In one embodiment, a method for transmitting a message between a first electronic of an energy distribution network to a second electronic device of the energy distribution network is provided. The transmitting includes: generating a first data encryption key identifying the second electronic device based on a main data encryption key and an identification code of the second electronic device; generating a data communication key based on said first data encryption key and a reference datum; encrypting the message using the data communication key; and transmitting the encrypted message to the second electronic device.

In another embodiment, a local energy distribution network is provided. The local energy distribution network includes a first electronic device comprising a concentrator, and a second electronic device comprising an energy consumption meter and operatively mutually connected to the first electronic device through a power line communication. The first and the second electronic devices are configured to encrypt a message by generating, by the first electronic device, a first data encryption key identifying the second electronic device based on a main data encryption key and an identification code of the second electronic device; and generating, by the first electronic device and the second electronic device, a data communication key based on said first data encryption key and a reference datum. The first and the second electronic devices are further configured to transmit the encrypted message between the first electronic device and the second electronic device.

BRIEF DESCRIPTION OF THE SEVERAL VIEWS OF THE DRAWINGS

Further characteristics of example embodiments are provided herein below, given by way of indicative, non-limiting examples, with reference to the annexed Figures, in which.

DETAILED DESCRIPTION

Figure 1:
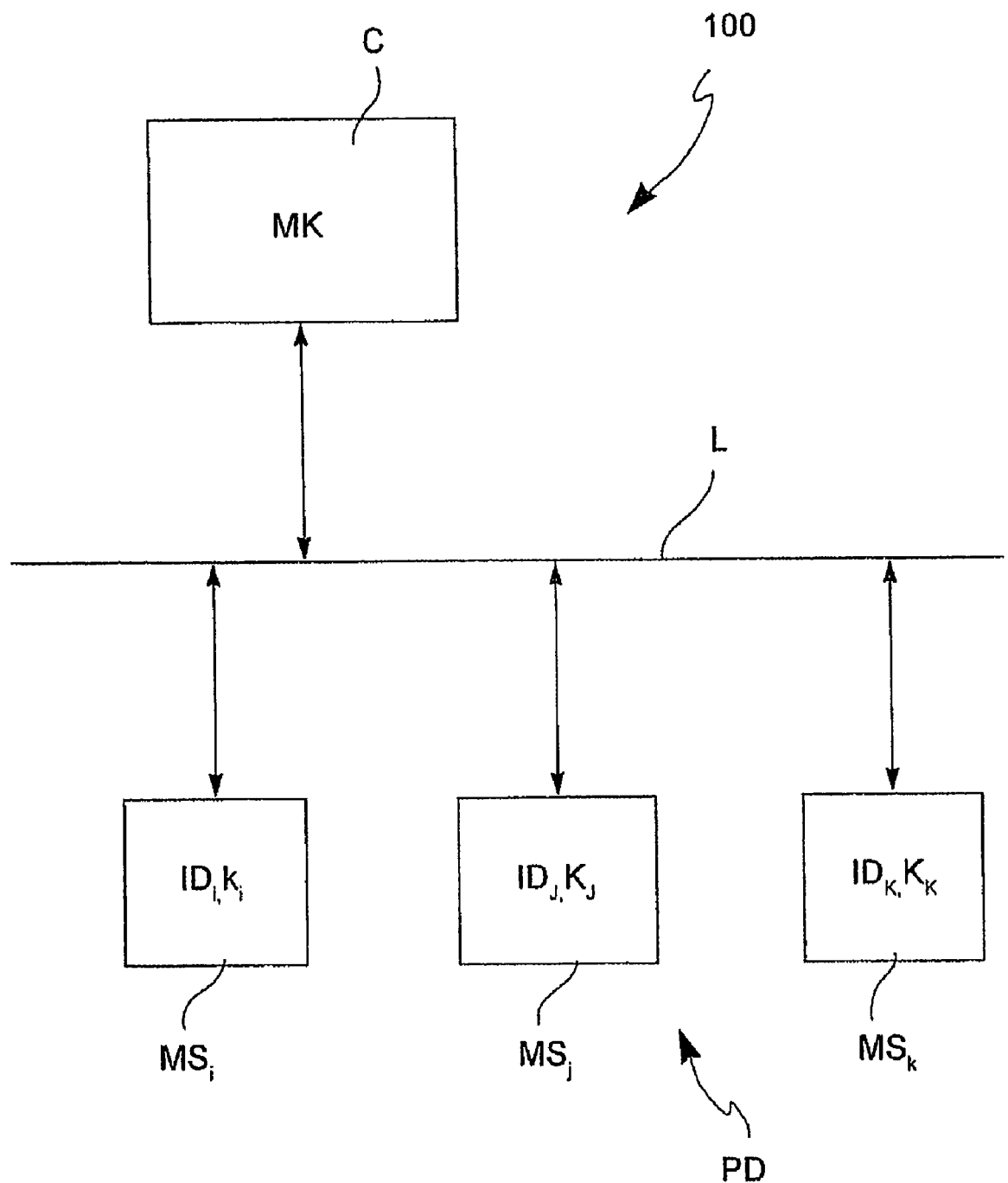
FIG. 1 schematically illustrates a portion of an energy distribution network in which the transmission method according to an example embodiment is employed.

With reference to FIG. 1, a local energy distribution network 100 is now described, in which a message transmission method is implementable according to an example embodiment.

By local energy distribution network, it is meant a portion of an energy distribution network representative of a local use area, for example a city district or area, of the energy supply (for example, electricity or gas).

The local energy distribution network 100 comprises a first electronic device C and at least one second electronic device $MS_i$ which are operatively mutually connected through a power line communication L.

It is pointed out that the local distribution network 100 may comprise a plurality of electronic devices PD, which are operatively connected to the power line communication L, each of which, as it will be described herein below, can be considered as similar to the second device $MS_i$.

For the sake of simplicity, the plurality of electronic devices PD illustrated in FIG. 1 comprises a third $MS_j$ and a fourth $MS_k$ electronic device, beside the already mentioned second electronic device $MS_i$.

The first electronic device C comprises, for example, a network concentrator arranged to be operatively connected also to a central unit (not shown in the Figure) of the operator of the energy distribution network 100 through a further dedicated power line communication (also not shown). The network concentrator C typically represents the so-called energy distribution box of a district.

The second electronic device $MS_i$ comprises an energy consumption meter preferably installed at the house or building of a user of the energy distribution network 100.

At an operative level, the concentrator C is arranged to carry out operations such as, for example: passage from medium voltage (e.g., some thousands of Volts received by the concentrator) to low voltage (e.g., 220 V to be provided to the meter of the individual user); reception by the central unit or another network electronic device (e.g., meter or concentrator) of alarm signals (for example, voltage overload), and indication to another meter or concentrator of a respective control signal preventively intended to electrically insulate a meter from the rest of the energy distribution network; reception from the meters of information relative to the respective energy consumption and transmission thereof to the central unit of the operator of the energy distribution network (concentrator acting as a repeater).

At the operative level, instead, the individual meter (for example, the second device $MS_i$) is arranged to carry out operations such as, for example: providing information relative to the energy consumptions to the concentrator; generating optional alarm signals representative of voltage overloads or electrical failures.

It shall be further noticed that, advantageously, both the first electronic device C and the second electronic device $MS_i$ are configured to implement the transmission method in accordance with an example embodiment that will be described herein below.

Figure 2:
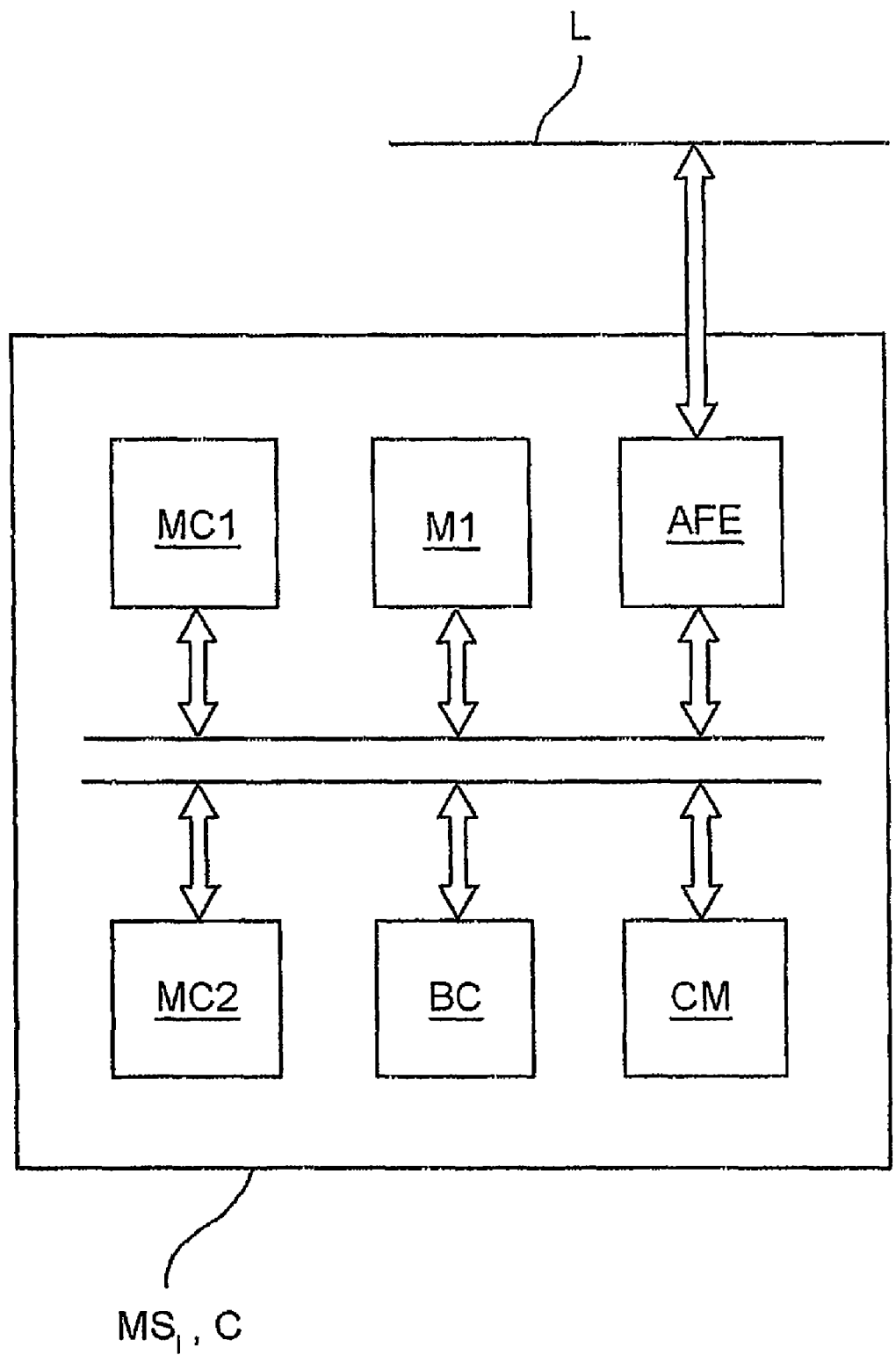
FIG. 2 schematically illustrates an element of the distribution system of FIG. 1.

With particular reference now to FIG. 2, the hardware structure of the first electronic device C is now schematically described.

The first electronic device C comprises a first microprocessor MC1 and a first memory M1 (of the RAM type) to implement and load, respectively, program codes for the carrying out of operations for which the first electronic device has been configured.

In order to increase the performance thereof, the first electronic device C further comprises a further processor MC2, for example, a DSP (Digital Signal Processor), and a memory controller CM arranged for the management of the first memory M1 and further memories (not shown in the Figure) with which the first electronic device C can be provided or to which it can be connected.

It is pointed out that for the implementation of the transmission method according to an example embodiment which will be described herein below, the first electronic device C is configured to implement, from a software point of view (through the use, for example, of the first microprocessor MC1 and the first memory M1), an encryption algorithm, for example, an AES (Advanced Encryption Standard) algorithm or a DES (Data Encryption Standard) algorithm, known to those skilled in the art.

In a further embodiment, alternative to the just described one, the first electronic device C further comprises a cipher block BC arranged for the implementation in hardware of the encryption algorithm (e.g., AES or DES).

The first electronic device C further comprises an analog-to-digital conversion block AFE to allow the first electronic device C, arranged to process signals in a digital format, to provide signals in an analog format to the power line communication L.

It shall be noticed that the example of hardware structure schematically described with reference to FIG. 2 substantially applies also to the second electronic device $MS_i$, since it is similar to the first electronic device C, except for the fact that it is free from optional connections to the second power line communication which is used, as already stated before, by the first electronic device C (concentrator) for the transmission of information to the central unit of the energy distribution network.

Figure 3:
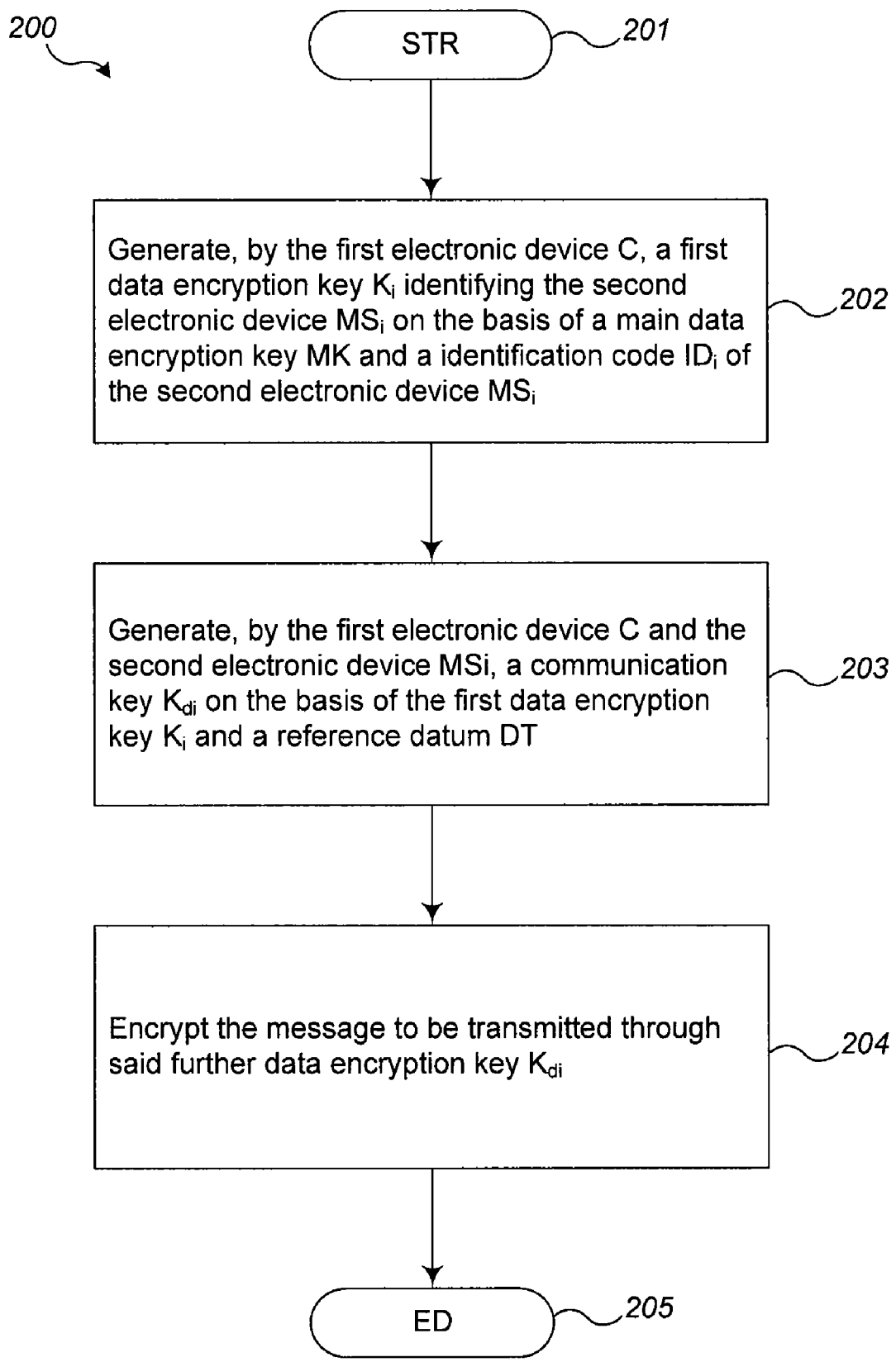
FIG. 3 schematically illustrates, via a block diagram, the transmission method according to an example embodiment.
Figure 4:
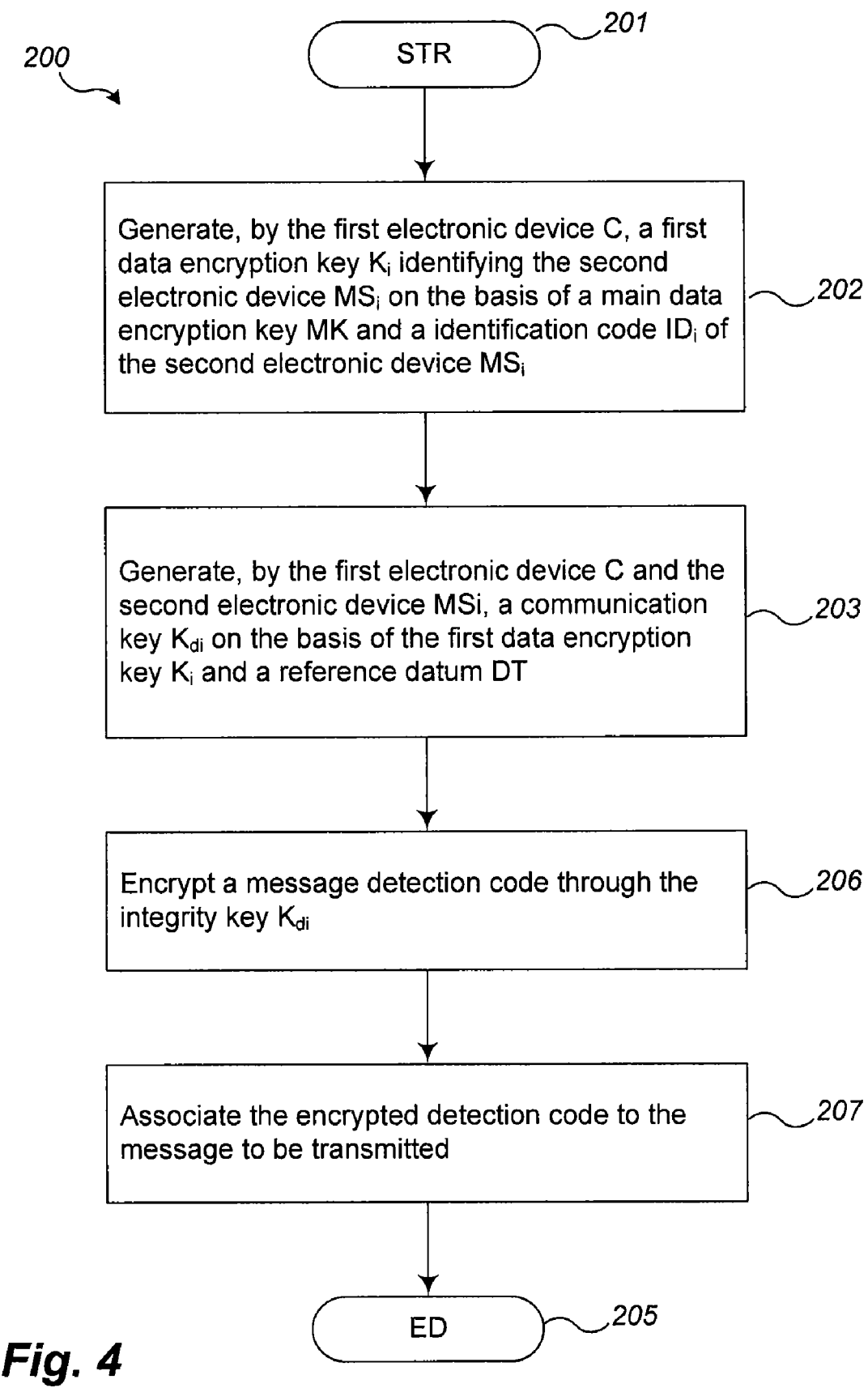
FIGS. 4 and 5 schematically illustrate, via block diagrams, methods according to further example embodiments.

With reference now to FIGS. 3 and 4, a message transmission method 200 between the first electronic device C and the second electronic device MSi according to an example embodiment is now described.

For the purposes of the present description, by message is meant a piece of information representative, for example, of the status of the energy distribution (for example, voltage overload), of the status of an electronic device connected thereto (meter or concentrator), or the energy consumption of a meter.

The transmission method 200 comprises a first symbolic initial step 201, also indicated with the reference STR.

The transmission method 200 further comprises a step of, implementing an encryption algorithm, generating 202, by the first electronic device C, a first data encryption key $K_i$ identifying the second electronic device $MS_i$ on the basis of a main data encryption key MK and a identification code $ID_i$ of the second electronic device $MS_i$.

The generating step 202 of the first encryption key can be symbolically expressed by the following relationship:

$$K = AES(MK, ID_i)$$

in which K represents the first data encryption key identifying the second electronic device MSi; MK represents the main encryption key which is known to the first electronic device C; $ID_i$ represents the identification code of the second electronic device $MS_i$, the acronym AES symbolically indicates the use of an encryption algorithm of the AES type.

As already stated before, also other encryption algorithms such as, for example, a DES-type algorithm, can be employed alternatively to the encryption AES algorithm.

As already stated before with reference to FIG. 2, the encryption algorithm is implemented in hardware by the cipher block AES with which the first electronic device C is provided.

Alternatively, the first electronic device C can be configured to implement the encryption AES algorithm via software.

Referring back to the generating step 202 of the first data encryption key K, it shall be noticed that the main data encryption key MK is typically associated to the first electronic device C in the manufacturing step, therefore it is known only to the first electronic device C.

The identification code $ID_i$ of the second electronic device MSi is typically an identification code associated and assigned to the relative electronic device (meter) during the manufacturing step.

Further, this identification code is known also to the first electronic device C (concentrator) following the installation in field of the second electronic device, i.e., when the second electronic device (meter) is operatively associated to the first electronic device C (concentrator) through the power line communication L.

It shall be further noticed that the first data encryption key K also is associated to the second electronic device $MS_i$ during the manufacturing step of the same electronic device.

The generating step 202 of the above-described first data encryption key advantageously allows the first electronic device C (concentrator) to avoid the storing of the encryption key of all the electronic devices similar to the second electronic device $MS_i$ connected thereto, but to be able to generate the first data encryption key $K_i$ identifying the second electronic device $MS_i$ at the moment of the message transmission.

It shall be further noticed that, since the first electronic device has a hardware structure which is similar to a conventional electronic computer (FIG. 2), the implementation of the encryption AES algorithm for the generation of the first data encryption key Ki is rather simple and rapid from a computational point of view.

In order to increase transmission safety between the first electronic device C and the second electronic device $MS_i$, the transmission method 200 further comprises, employing the above-mentioned encryption AES algorithm, a generating step 203, by the first electronic device C and the second electronic device MSi, of a communication key $K_{di}$ on the basis of the first data encryption key $K_i$ and a reference datum DT.

The generating step 203 can be symbolically expressed also by the following relationship:

$$K_{di} = AES(K_i, DT)$$

in which $K_{di}$ represents the communication key to be used for the transmission between the first C and the second $MS_i$ electronic devices; $K_i$ represents the first data encryption key; DT represents a reference datum (which will be dealt with herein below), and the acronym AES indicates the use of an encryption algorithm of the AES type.

As regards the reference datum DT, it comprises, for example, a temporal reference representative of the moment in which the generation (or derivation) of the data communication key $K_{di}$ occurs, both by the first electronic device C and by the second electronic device $MS_i$.

Such temporal reference can be, for example, the year, month, day, the complete date (e.g., in terms of day, month, or year), or time (e.g., in terms of hours, minutes, and seconds).

In an alternative embodiment to the just described one, the reference datum DT may comprise a numeral reference obtained as a combination of two or more temporal references described before.

Combination examples of temporal references to generate the numeral reference which can be used by the described method as the reference datum DT can be, with reference again to the moment in which the generation of the data communication key $K_{di}$ occurs: combination of year and month; combination of day and month; combination of date and time; combination of one of the above-mentioned temporal references and a numeric constant.

It is pointed out that the data communication key $K_{di}$ preferably comprises a further message encryption key arranged to advantageously carry out a warranty function of the confidentiality of the content of the same message. A message the confidentiality of which is intended to be maintained can be, for example, a piece of information relative to the energy consumption in a consumption meter.

In this embodiment, following the generating step 203 of the data communication key $K_{di}$, the transmission method 200 further comprises the encrypting step 204 of the message to be transmitted through said further data encryption key $K_{di}$, preferably by implementing the encryption AES algorithm.

In a further alternative embodiment to the just described one (FIG. 4), the data communication key $K_{di}$ comprises a message integrity key arranged to advantageously carry out a warranty function of the integrity of the message to be transmitted. A message of which it is the integrity that is intended to be maintained, but not necessarily the confidentiality as well, can be, for example, a piece of information representative of a control signal which the first electronic device C (concentrator) sends to the second electronic device $MS_i$ (meter) with the purpose to temporarily disconnect the meter itself from the local distribution network, in order to avoid an electrical failure thereof.

In more detail, the message integrity key allows encrypting, by employing the encryption algorithm, a detection code to be associated to the message to be transmitted, typically at the foot thereof.

As it is known, the receiving electronic device (for example, the second electronic device $MS_i$), once the message transmitted with the encrypted detection code at the foot thereof has been received from the transmitting electronic device (for example, the first electronic device C), is arranged to decrypt the encrypted detection code through the integrity key $K_{di}$. In the case where the decrypted detection code is the same as that used by the first electronic device, the message results not to be altered by an attacker, and therefore it can be considered as intact.

It is pointed out that for the encryption of the detection code, an encryption algorithm of the AES type or of the AES CBC-MAC (Cipher Block Chaining Message Authentication Code) type can be employed.

In this particular embodiment, as shown in FIG. 4, the transmission method 200 therefore comprises an encrypting step 206 of a message detection code through the integrity key $K_{di}'$ and an associating step 207 of the encrypted detection code to the message to be transmitted.

Figure 5:
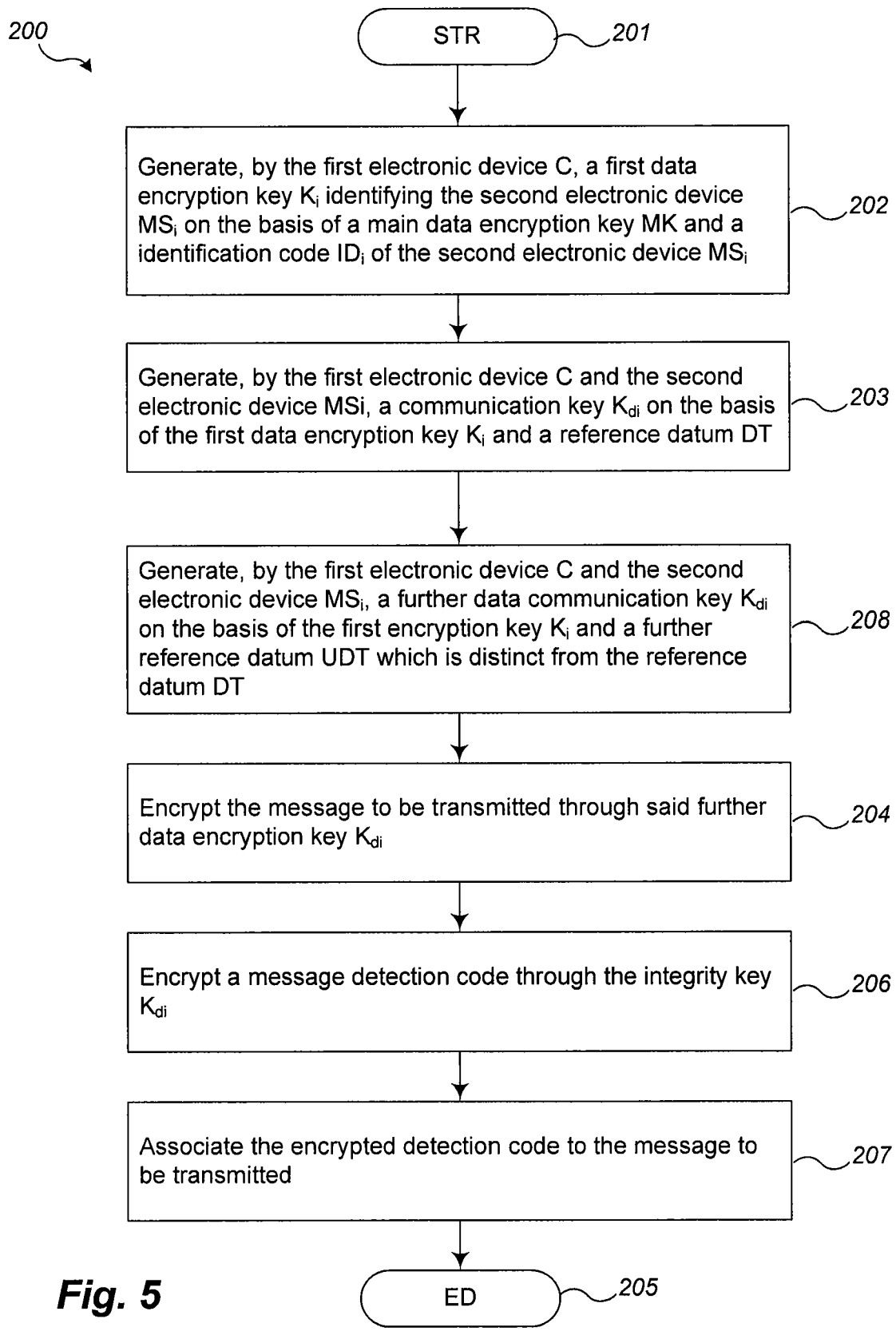

With reference now to the embodiment of FIG. 5, the method 200 can further comprise a generating step 208, implementing the same encryption AES algorithm, by the first electronic device C and the second electronic device $MS_i$, of a further data communication key $K_{di}$ on the basis of the first encryption key $K_i$ and a further reference datum UDT which is distinct from the reference datum DT described before with reference to the generating step 203 of the communication key $K_{di}$.

The generating step 208 can be symbolically expressed by the following relationship:

$$K_{di}' = AES(K_i, UDT)$$

in which $K_{di}'$ represents the further data communication key; $K_i$ represents the first data encryption key generated in the previous generating step 203, and UDT represents the further reference datum.

The further data communication key $K_{di}'$ will be used by both the first electronic device C and the second electronic device $MS_i$ to encrypt (step 204) the message to be transmitted through the encryption algorithm (for example, of the AES type), in the case where the data communication key $K_{di}$ is used for the message integrity as described before.

It shall be further noted that, for the embodiment of FIG. 5, again the encrypting step 206 of the message detection code and the associating step 207 of the encrypted detection code to the message to be transmitted, already described before, are present.

It is pointed out that this embodiment advantageously allows further increasing the message transmission safety between the first electronic device C and the second electronic device $MS_i$, since the further data communication key $K_{di}'$ is generated and employed to ensure the message integrity, and the data communication key $K_{di}$ is generated and employed to contextually ensure also the message confidentiality.

As regards the further reference datum UDT, it shall be noticed that it results to be of the same type of the temporal datum DT, that is, it is implemented by a temporal reference representative of the moment in which the generation (or derivation) of the further data communication key $K_{di}'$ occurs, by both the first electronic device C and the second electronic device $MS_i$.

Such temporal reference can be, for example, the year, month, day, the complete date (in terms of day, month, or year), or time (in terms of hours, minutes, and seconds).

In an alternative embodiment, the further reference datum UDT can comprise a numeral reference obtained as a combination or processing of one or more temporal references described before.

Combination or processing examples of temporal references to generate the numeral reference which can be used by the described method as the further reference datum UDT can be, with reference again to the moment in which the generation of the data communication key $K_{di}$ occurs: combination of year and month; combination of day and month; combination of date and time; combination of one of the above-mentioned temporal references and a numeric constant.

For the purposes of the present invention, with the purpose of ensuring a reliable safely level in the transmission of the message between the first electronic device C and the second device $MS_i$, the further temporal datum UDT is preferably distinct from the temporal datum DT.

With the term "distinct" is meant that the further reference datum UDT results to be different from the reference datum DT.

Some examples of reference datum DT and further reference datum UDT are:
UDT=date, DT=month;
UDT=date, DT=time;
UDT=date and time combination, DT date and constant combination;
UDT=time and constant combination, DT=year and constant combination; and so on.

Referring back to the transmission method 200 with reference both to the embodiment of FIG. 3 and the embodiment of FIG. 4, it further comprises a symbolic final step 205, also indicated with the symbolic reference ED.

The described transmission method, in the case where the data communication key is employed as the message encryption key, allows the first electronic device (C) and the second electronic device ($MS_i$) to be able to encrypt the message through the data communication key ($K_{di}$), without needing to share a priori the knowledge of the above-mentioned data communication key. The same considerations can be stated in the case, instead, that the data communication key is not employed to ensure the message confidentiality, but in order to ensure the integrity thereof (data communication key as a message integrity key).

Furthermore, the fact that the data communication key ($K_{di}$) is generated (or derived) by the first and the second electronic devices on the basis of a reference datum (DT), which depends on the moment in which the message transmission occurs, advantageously reduces the risks for the integrity of the data to be transmitted, increasing the robustness of the energy distribution network as regards the communication of the data pertaining both to the consumption on the network and the control of the same network.

In fact, in the case where an attacker succeeds in accessing a data communication key ($K_{di}$), he/she will be capable of retrieving the content of the encrypted message only with that data communication key ($K_{di}$) which, as stated before, has been generated as a function of a reference datum (DT) as a function of a predetermined transmission moment, but not as a function of the previous or successive transmission moment. Therefore, the attacker will not be able to retrieve other messages any longer by employing the same data communication key ($K_{di}$).

Further, the embodiment of the transmission method which further comprises a generation (or derivation) step of a further data communication key ($K_{di}'$) on the basis of the first data encryption key ($K_i$) and on the basis of a further reference datum (UDT) which is distinct from the previous reference datum (DT, used to generate the previous data communication key) advantageously increases the safety and robustness of the transmission of messages between the first and the second electronic devices, since both a confidentiality level (employing the further data communication key $K_{di}'$) and an integrity level (employing the data communication key $K_{di}$) of the message to be transmitted are brought in.

In fact, an attacker's task is still more difficult, since the introduction of a further reference datum (UDT) increases the interception degree of the message. In other terms, in the case where the data communication key ($K_{di}$) is intercepted, it will result that, upon reception, the message could not be intact, but it will not be able to be retrieved, since the latter will be encrypted with the further data communication key ($K_{di}'$). Furthermore, although an attacker succeeds in retrieving the reference datum (DT) with which the data communication key ($K_{di}$) has been generated, in no event he/she will be able to get the further data communication key ($K_{di}'$), since it has been generated (or derived) on the basis of a further reference datum (UDT) which is distinct from the reference datum (DT) that he/she is in possession of.

Finally, it has to be also taken into account that the use, as the reference datum (DT) and as the further reference datum DT), not of the simple temporal references (year, month, date, or time), but of numeric references obtained as a combination of temporal references or as a combination of temporal references with one or more additional numeric constants, further increases the interception difficulty of the message by an attacker, and consequently the reliability and robustness of the transmission of messages between the first and the second electronic devices.

To the above-described embodiments of the method, those of ordinary skill in the art, in order to meet contingent needs, will be able to make modifications, adaptations, and replacements of elements with other functionally equivalent ones, without departing from the scope of the following claims. Each of the characteristics described as belonging to a possible embodiment can be implemented independently of the other embodiments described.

The various embodiments described above can be combined and/or modified to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
transmitting a message between a first electronic device of an energy distribution network and a second electronic device, the second electronic device being an energy consumption meter coupled to the first electronic device through a power line communication, the transmitting including:
generating, by the first electronic device, a first data encryption key identifying the second electronic device based on a main data encryption key and an identification code of the second electronic device;
generating, by the first electronic device and the second electronic device, a data communication key based on said first data encryption key and a reference datum;
encrypting the message using the data communication key; and transmitting the encrypted message between the first electronic device and the second electronic device.

2. The method according to claim 1 wherein said data communication key comprises a second data encryption key, and further comprising encrypting said message using said second data encryption key.

3. The method according to claim 1 wherein said data communication key comprises a message integrity key, and further comprising encrypting a message detection code using the message integrity key.

4. The method according to claim 3, further comprising associating said encrypted detection code to the message.

5. The method according to claim 4 further comprising generating, by the first electronic device and the second electronic device, at least one further data communication key based on said data encryption key and a further reference datum distinct from said reference datum.

6. The method according to claim 5, further comprising encrypting said message through said further data communication key.

7. The method according to claim 5 wherein said reference datum and said further reference datum comprise a temporal reference.

8. The method according to claim 7 wherein said reference datum and said further reference datum comprise a numeral reference obtained as a combination of the temporal reference with a numeric constant.

9. The method according to claim 5 wherein said reference datum and said further reference datum comprise a numeral reference obtained as a combination of one or more temporal references.

10. The method according to claim 1 wherein encrypting the message is based on at least one of Advanced Encryption Standard (AES) and Data Encryption Standard (DES).

11. The method according to claim 10 wherein encrypting the message is implemented via software.

12. The method according to claim 10 wherein encrypting the message is implemented in hardware by a cipher block.

13. A local energy distribution network, comprising:
a first electronic device comprising a concentrator; and
a second electronic device comprising an energy consumption meter and operatively mutually connected to the first electronic device through a power line communication,
wherein said first and said second electronic devices are configured to:
encrypt a message by:
generating, by the first electronic device, a first data encryption key identifying the second electronic device based on a main data encryption key and an identification code of the second electronic device; and
generating, by the first electronic device and the second electronic device, a data communication key based on said first data encryption key and a reference datum; and
transmit the encrypted message between the first electronic device and the second electronic device.

14. The network of claim 13 wherein said data communication key comprises a further data encryption key, and wherein said first and said second electronic devices are further configured to encrypt said message using said further data encryption key.

15. The network of claim 13 wherein said data communication key comprises a message integrity key, and wherein said first and said second electronic devices are further configured to:
encrypt a message detection code using the message integrity key, and associate; and
associate said encrypted detection code to said message.

16. The network of claim 15 wherein said first and said second electronic devices are further configured to:
generate at least one further data communication key based on said data encryption key and a further reference datum distinct from said reference datum; and
encrypt said message through said further data encryption key.

17. The network of claim 16 wherein said reference datum and said further reference datum comprise a temporal reference that includes at least one of: year, month, date, and time.

18. The network of claim 13 wherein said first and said second electronic devices are configured to encrypt the message using at least one of Advanced Encryption Standard (AES) or Data Encryption Standard (DES).

19. A method, comprising:
in a first electronic device of an energy distribution network, transmitting a message to a second electronic device of the energy distribution network by:
generating a first data encryption key identifying the second electronic device based on a main data encryption key and an identification code of the second electronic device;
generating a data communication key based on said first data encryption key and a reference datum;
encrypting the message using the data communication key; and
transmitting the encrypted message to the second electronic device.

20. The method of claim 19 wherein generating the data communication key includes generating the data communication key based a temporal reference that depends upon a time of the transmitting of the message, the temporal reference including at least one of a year, a month, a date, and a time corresponding to the time of the transmission.

21. The method of claim 20 further comprising, at a time later than the transmitting of the message, transmitting a second message to the electronic device, the transmitting using a data communication key based on a temporal reference that depends on the later time.

22. The method of claim 19 wherein the data communication key includes a message integrity key, and wherein transmitting the message includes encrypting a message detection code using the message integrity key, and associating the encrypted message detection code to the message.

23. The method of claim 22 further comprising generating a second data communication key based on said data encryption key and a further reference datum distinct from said reference datum.

* * * * *